United States Patent
Grimes et al.

[11] Patent Number: 6,047,021
[45] Date of Patent: Apr. 4, 2000

[54] METHODS AND APPARATUS FOR EXCHANGING DATA

[76] Inventors: James E. Grimes, 875 Wokonda Trail, Stanardsville, Va. 22973; Daniel W. Sexton, 2140 Wisteria Dr., Charlottesville, Va. 22911

[21] Appl. No.: 09/244,237

[22] Filed: Feb. 3, 1999

Related U.S. Application Data

[60] Provisional application No. 60/081,976, Apr. 16, 1998.
[51] Int. Cl.[7] .................................. H04B 1/38; H04L 7/00
[52] U.S. Cl. ........................... 375/220; 375/355; 713/400
[58] Field of Search .................................... 375/220, 219, 375/259, 354, 355, 377, 369, 370; 327/141, 144, 145; 713/400

[56] References Cited

U.S. PATENT DOCUMENTS

| | | | |
|---|---|---|---|
| 4,847,867 | 7/1989 | Nasu et al. | 375/354 |
| 5,379,327 | 1/1995 | Sharma et al. | 375/377 |
| 5,434,891 | 7/1995 | Mery et al. | 375/377 |
| 5,692,166 | 11/1997 | Milhizer et al. | 375/355 |
| 5,761,253 | 6/1998 | Fujita et al. | 375/354 |

*Primary Examiner*—Stephen Chin
*Assistant Examiner*—Betsy L. Deppe
*Attorney, Agent, or Firm*—Carl Horton, Esq.; Armstrong Teasdale LLP

[57] ABSTRACT

The present invention is a communication unit for exchanging data. More specifically, the unit includes an initiator and a responder that exchange data with a single time base. In one embodiment, the initiator generates a time base output signal that is used for determining a multiple of the rate at which data will be transferred to the responder. When data is received from the responder, the time base signal is used to over-sample the data to determine the point at which the data from the responder is valid.

15 Claims, 1 Drawing Sheet

METHODS AND APPARATUS FOR EXCHANGING DATA

CROSS REFERENCE TO RELATED APPLICATIONS

This application claims the benefit of U.S. Provisional Application No. 60/081,976, filed Apr. 16, 1998.

BACKGROUND OF THE INVENTION

This invention relates generally to data communications and, more particularly, to a communication unit for exchanging serial data.

Known communication systems are extensively used with many types of electronic equipment. The communications systems are used to transmit serial data between two pieces of electronic equipment. For example, some known computers utilize communication systems to transmit serial data back and forth between two computers at high rates of speed. The serial data is typically transmitted between the two computers using either a synchronous or asynchronous communication system.

In synchronous communication systems, clock pulses and data are simultaneously transmitted from the first piece of equipment to the second piece of equipment over a cable. The clock pulses from the first piece of equipment establish the speed at which the data will be exchanged. The second piece of equipment that is responding to the first piece of equipment uses the edges of these clock pulses to recover the data sent from the first piece of equipment and also to time the return of data to be sent to the first piece of equipment. During transmission of the data from the first piece of equipment to the second piece of equipment, the clock pulses and data undergo equal delays due to length and loading of the cable. As a result, the phase relationship of the data and clock pulses sent by the first piece of equipment is preserved at the second piece of equipment. When the data link direction is reversed and data is sent from the second piece of equipment to the first piece of equipment, the cable delay not only delays the clock as it propagates from the first piece of equipment to the second piece of equipment, but also delays the data the same amount as it propagates from the second piece of equipment back to the first piece of equipment. The first piece of equipment, having only the original clock pulses with which to sample the returned data, is presented with data which is delayed an unknown amount of time, this time being a function of the cable loading and length. As a result, reliable data exchange is limited to the round trip delay of signals and the tolerance of the first piece of equipment to skew between clock and data.

In other known communication systems, serial data is transmitted between the first and second pieces of equipment using an asynchronous communication system. Asynchronous systems overcome the problem of round trip delays by requiring both the first and second piece of equipment to maintain separate time bases. The beginning of data transmission is signaled by pre-pending, or sending, a start bit from the transmitter to the receiver. The initiating edge of this start bit allows the receiver to lock phase with the start bit and recover subsequent bits which maintain phase with the start bit. As a result, reliable data exchange is maintained as long as the time bases of the first and second pieces of equipment have been set to the same frequency. In addition, the first and second pieces of equipment must maintain a small percentage drift between the two time bases between the time the start bit is transmitted and the time the final data bit associated with this start bit is received, otherwise the data will be improperly received.

As described above, these known methods of transmitting serial data each suffer from limitations in their ability to transmit data. These limitations often require a tradeoff analysis to be conducted to determine which of the two methods produce the maximum benefit.

It is desirable to provide apparatus and methods for transmitting serial data that uses a time base to determine the speed of data transmission and is not limited by cable delays.

BRIEF SUMMARY OF THE INVENTION

These and other objects may be attained by a communication link, or unit, which, in one embodiment, includes an initiator that generates a time base and a responder. Using the initiator time base, data can be accurately transferred between the initiator and the responder.

More particularly, and in one exemplary embodiment, the communication unit has two modes, or states. These states of operation sometimes are referred to herein as the transmit state and the receive state. The transmit state refers to the condition where data is transferred from the initiator to the responder. Prior to transmitting data to the responder, a time base clock output signal is generated from which a transmit clock output signal is created. Data and the transmit clock signal are then transmitted to the responder.

The receive state refers to the condition where data is transferred from the responder to the initiator. By oversampling the data being transferred to the initiator, using the time base clock signal, the initiator is able to determine the center point of the data. Once the center point is defined, all bits of the transferred data may be properly determined. Upon receiving the next start bit, the center point is again determined to properly recognize the data bits being transmitted from the responder.

Utilizing the time base clock signal, the unit is able to determine the proper timing to receive the transmitted data. As a result, the unit does not require independent time bases. In addition, transfer speed of the unit is not limited by cable delays.

The above described communication unit allows data to be reliably transmitted using a single time base while not being limited by cable delays.

DETAILED DESCRIPTION OF THE INVENTION

Figure 1:
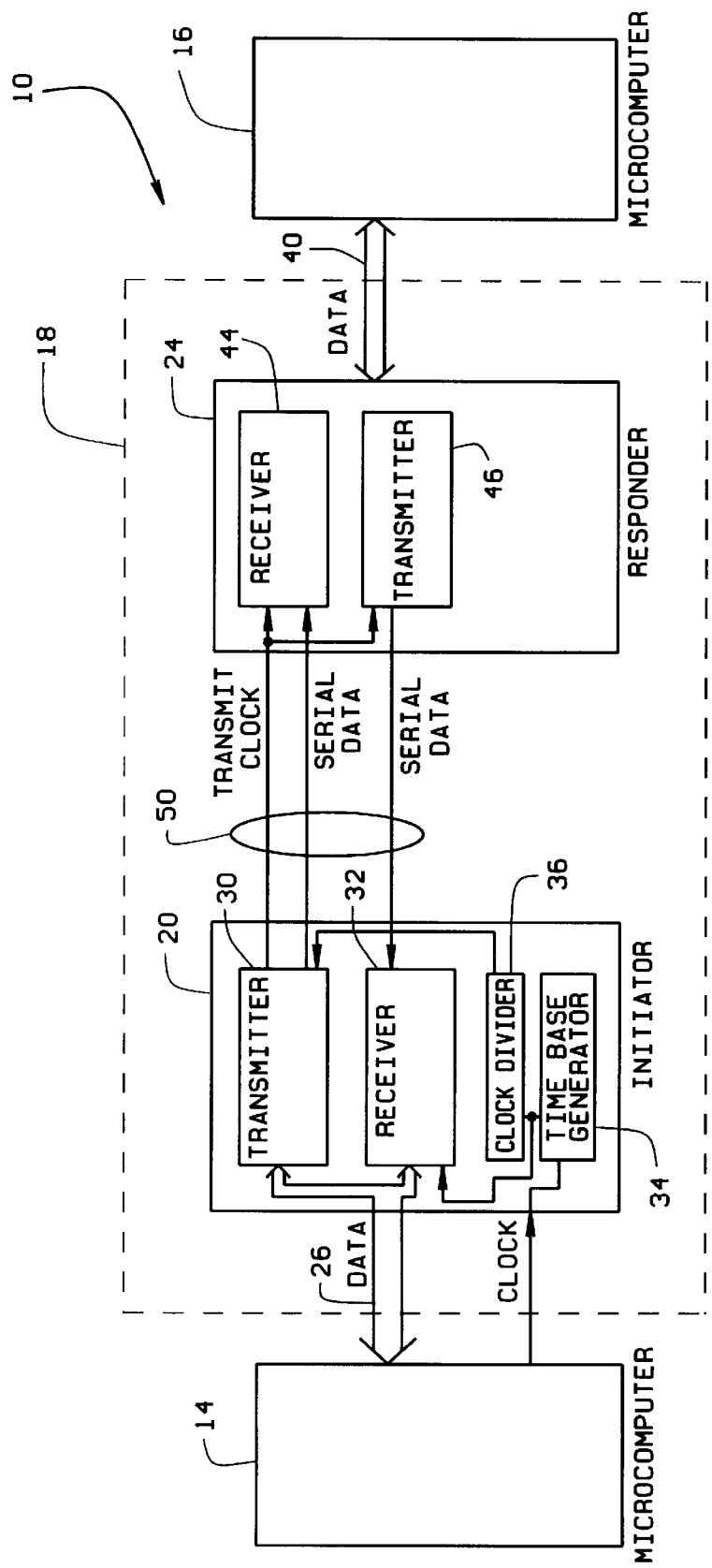
FIG. 1 is a block diagram of a communication system in accordance with one embodiment of the present invention.

FIG. 1 is a block diagram of a communication system 10 according to one embodiment of the present invention. Communication system 10 includes a first microcomputer 14, a second microcomputer 16 and a communication link, or unit, 18. Microcomputers 14 and 16, in operation, typically are coupled to a variety of input devices (not shown), for example, storage devices and operator entry devices, e.g., a keyboard. Using information from these input devices, microcomputers 14 and 16 are capable of generating data. This data can then be exchanged with other microcomputers using communication unit 18. Communication unit 18 includes an initiator 20 and a responder 24.

Data signals are bidirectionally coupled between microcomputer 14 and initiator 20 using data bus 26. Initiator 18 includes a transmitter 30 for transmitting serial data to responder 24 and a receiver 32 for receiving serial data from responder 24. Transmitter 30 and receiver 32 are coupled to data bus 26. A time base generator 34 is coupled to the clock signal from microcomputer 14 to generate a pulsed time base clock output signal. The time base clock signal is coupled to receiver 32 and a clock divider 36 that generates a pulsed transmit clock output signal. The transmit clock signal is coupled to transmitter 30. The serial data is transferred from transmitter 30 and received by receiver 44 at a rate that is determined by generator 34 and divider 36, specifically, the transmit clock signal. In one embodiment, for example, transmitter 30 and receiver 32 may be shift registers that convert parallel data from data bus 26 to serial data, time base generator 34 may be counter, and clock divider 36 may be a divide by N counter. Clock divider 36 divides the time base clock signal by an integer, for example, four.

Responder 24 is coupled to microcomputer 16 using bidirectional bus 40 so that data may be transferred between microcomputer 16 and responder 24. Specifically, data is coupled from microcomputer 16 to receiver 44 and transmitter 46, using bus 40. In one embodiment, for example, receiver 44 is a shift register that is identical to receiver 32 and transmitter 46 is a shift register that is identical to transmitter 30. The width of the shift register parallel bus may be selected depending on, for example, the width of data from microcomputers 14 and 16, e.g., 8 bits, 16, bits, etc.

Serial data is transferred between initiator 20 and responder 24 using a multi-conductor cable 50. Specifically, cable 50 couples the transmit clock signal from transmitter 30 to receiver 44, serial data from transmitter 30 to receiver 44, and serial data from transmitter 46 to receiver 32.

Many functions and modifications of the components described above are well understood in the communications art. The present application is not directed to such understood and known functions and modifications. Rather, the present application is directed to the methods and apparatus for exchanging data as described below in more detail.

Further, it should be understood that the present application can be practiced with many alternative microcomputers, and is not limited to practice in connection with just microcomputers 14 and 16. Therefore, as used herein, the term microcomputer is not limited to mean just those integrated circuits referred to in the art as microcomputers, but broadly refers to microcomputers, processors, microcontrollers, application specific integrated circuits, other programmable circuits, as well as other data generation devices.

Communication unit 18 has two different modes, or state of operation. These states of operation are referred to herein as the transmit state and the receive state. The transmit state of unit 18 refers to the state of unit 18 when data is being transmitted from initiator 20 to responder 24. In transmit state, data is transferred from microcomputer 14 to microcomputer 16 using communication system 18. More specifically, transmitter 30 of initiator 20 transmits, or transfers, the transmit clock signal and the serial data to receiver 44 of responder 24 using cable 50. Particularly, while transmitting the initiator transmit clock signal to responder 24, a single start bit is pre-pended, or sent, prior to transmitting bits of data from initiator 20 to responder 24. The start bit notifies receiver 44 that serial data will follow. Upon receiving the start bit, receiver 44 begins to receive serial data from transmitter 30. The serial data is received at receiver 44 by sampling the serial data at a rate determined by the transmit clock signal transmitted from initiator 20. Specifically, the serial data is sampled on the leading transition edges of the transmit clock signal. As the bits of serial data are received at receiver 44, the data is transferred to microcomputer 16 using data bus 40.

The receive state of unit 18 refers to the state of unit 18 when data is being transmitted from responder 24 to initiator 20. In receive state, data is transferred from microcomputer 16 to microcomputer 14 using communication system 18. More specifically, transmitter 46 of responder 24 transmits the serial data to receiver 32 of initiator 20 using cable 50. Prior to transferring the first data bit, a single start bit is pre-pended, or sent, from responder 24 to initiator 20, using cable 50. The start bit notifies receiver 32 that serial data will follow. After sending the start bit, the serial data is transmitted from transmitter 46 and received at receiver 32 at a rate determined by the transmit clock signal. Specifically, the serial data is sequenced using the edges of the initiator transmit clock pulses. On observing the leading transition edge of the start bit, initiator receiver 32 is able to determine the center point of the first and subsequent data bits by over-sampling the data at a rate determined by the time base clock signal created by generator 34. As the bits of serial data are received at receiver 32, the data is transferred to microcomputer 14 using data bus 26. Upon receiving the next start bit, the center point is again determined to properly recognize the data bits being transmitted from the responder.

The above described communication unit allows data to be reliably transferred using a single time base. Using the single time base avoids the need to setup the responder because the transfer rate is set by the initiator. The communication unit also allows the initiator to synchronously transfer data and asynchronously receive data while allowing the responder to synchronously transmit and receive data. In addition, the data transfer rate is not limited by cable delays. Therefore, data transfer rates do not have to be set in both the initiator and the responder.

In another embodiment, communication system 10 includes a single initiator 18 and a plurality of responders 24. Data is exchanged between initiator 18 and a selected responder 24 by transmitting an unique address to each responder 24. Only that responder 24 having an address equal to the transmitted address will be enabled and data will be exchanged only between enabled responder 24 and initiator 18, as described above. After completing the data transfer, data may be exchanged between a different responder 24 and initiator 18 by transmitting a different unique address to responders 24.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

We claim:

1. A method of exchanging data in a system including an initiator and a responder, the initiator configured to generate transmit clock pulses and time base clock pulses, the responder configured to receive and transmit data at a rate determined by the initiator transmit clock pulses, said method comprising the steps of:

transmitting the initiator transmit clock pulses to the responder;

transmitting bits of data from the initiator to the responder;

receiving bits of data at the responder;

transmitting bits of data from the responder to the initiator; and sampling the data received from the responder at a rate determined by the time base clock pulses.

2. A method in accordance with claim 1 wherein receiving bits of data at the responder comprises the step of sampling the data transmitted to the responder on the edges of the initiator transmit clock pulses.

3. A method in accordance with claim 1 wherein transmitting bits of data from the responder comprises the step of sequencing the data using the edges of the initiator transmit clock pulses.

4. A method in accordance with claim 3 wherein transmitting bits of data from the responder to the initiator further comprises the step of transmitting a start bit.

5. A method in accordance with claim 1 wherein transmitting the initiator transmit clock pulses to the responder comprises the step of:

generating the transmit clock pulses by dividing the time base clock pulses by a pre-selected integer.

6. A method in accordance with claim 5 wherein transmitting bits of data from the responder to the initiator comprises the step of:

detecting a start bit.

7. A communication system for exchanging data comprising:

an initiator for transmitting and receiving serial data, said initiator configured to generate transmit clock pulses and time base clock pulses and use the transmit clock pulses to control the flow of serial data transmitted from said initiator and use the time base clock pulses to sample serial data received at said initiator; and a responder configured to receive and transmit serial data at a rate determined by the initiator transmit clock pulses.

8. A communication system in accordance with claim 7 wherein said responder is further configured to transmit a start bit.

9. A communication system in accordance with claim 7 wherein said transmit clock pulses are generated from the time base clock pulses.

10. A communication unit for exchanging data comprising an initiator and a responder, said unit configured to:

generate transmit clock pulses and time base clock pulses using the initiator;

transmit the transmit clock pulses from the initiator to the responder;

transmit data from the initiator to the responder at a rate determined by the initiator transmit clock pulses;

transmit data from the responder to the initiator at a rate determined by the initiator transmit clock pulses; and sample data received from the responder at a rate determined by the time base clock pulses.

11. A communication unit in accordance with claim 10 wherein to transmit data to the responder, said communication unit is configured to sample the data received at the responder on the edges of the transmit clock pulses.

12. A communication unit in accordance with claim 10 wherein to transmit data from the responder, said communication unit is configured to sequence the data using the edges of the initiator transmit clock pulses.

13. A communication unit in accordance with claim 12 wherein to transmit data from the responder to the initiator, said communication unit is further configured to transmit a start bit.

14. A communication unit in accordance with claim 10 wherein to transmit the initiator transmit clock pulses to the responder, said communication unit is configured to:

generate time base clock pulses in the initiator;

generate the transmit clock pulses by dividing the time base clock pulses by a pre-selected integer.

15. A communication unit in accordance with claim 14, wherein to receive data at the initiator from the responder, said communication unit is configured to:

detect the start bit; and sample the data received from the responder at a rate determined by the time base clock pulses.

* * * * *